United States Patent
Gren et al.

(10) Patent No.: US 10,911,671 B2
(45) Date of Patent: Feb. 2, 2021

(54) AUTOMATIC PROCESSING OF AUTOMATIC IMAGE CAPTURE PARAMETER ADJUSTMENT

(71) Applicant: Microsoft Technology Licensing, LLC, Redmond, WA (US)

(72) Inventors: Juuso Gren, Kyroskoski (FI); Mikko Muukki, Tampere (FI); Tomi Sokeila, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/170,010

(22) Filed: Oct. 24, 2018

(65) Prior Publication Data

US 2019/0068883 A1 Feb. 28, 2019

Related U.S. Application Data

(63) Continuation of application No. 14/609,816, filed on Jan. 30, 2015, now Pat. No. 10,136,061.

(51) Int. Cl.
*H04N 5/232* (2006.01)
*H04N 5/235* (2006.01)
*H04N 5/225* (2006.01)

(52) U.S. Cl.
CPC ....... *H04N 5/23245* (2013.01); *H04N 5/2257* (2013.01); *H04N 5/232* (2013.01); *H04N 5/235* (2013.01); *H04N 5/23258* (2013.01)

(58) Field of Classification Search
CPC ............. H04N 5/23245; H04N 5/2257; H04N 5/23258; H04N 5/369; H04N 5/232; H04N 5/235; H04N 5/2353; H04N 5/238; H04N 5/351; H04N 5/353; H04N 5/23248; H04N 5/23254; H04N 5/2327
USPC ................................ 348/362, 363, 364, 366
See application file for complete search history.

(56) References Cited

U.S. PATENT DOCUMENTS

| | | | | |
|---|---|---|---|---|
| 10,136,061 | B2* | 11/2018 | Gren | H04N 5/2257 |
| 2008/0260375 | A1* | 10/2008 | Yumiki | H04N 5/23219 396/263 |
| 2015/0189221 | A1* | 7/2015 | Nakase | H04N 1/00 386/225 |
| 2016/0191816 | A1* | 6/2016 | Hoshika | H04N 5/2621 386/280 |

* cited by examiner

*Primary Examiner* — Albert H Cutler

(57) ABSTRACT

In one example, a plurality of image frames captured by a digital camera unit is received. It is determined that a condition is met that requires a switch between image capture states. In response, automatic adjustment of at least one image capture parameter without user input is enabled or disabled.

20 Claims, 5 Drawing Sheets

AUTOMATIC PROCESSING OF AUTOMATIC IMAGE CAPTURE PARAMETER ADJUSTMENT

PRIORITY INFORMATION

This application is a continuation application of and claims priority to U.S. patent application Ser. No. 14/609,816, entitled "AUTOMATIC PROCESSING OF AUTOMATIC IMAGE CAPTURE PARAMETER ADJUSTMENT," filed on Jan. 30, 2015, the disclosure of which is incorporated herein by reference in its entirety.

BACKGROUND

Digital cameras often allow automatic adjustment of various image capture parameters, such as automatic adjustment of exposure, automatic adjustment of focus and automatic adjustment of white balance. These can be enabled and disabled manually by the user via a graphical user interface. Often, these automatic adjustments are enabled when capturing video or still images to allow optimal quality. Moreover, various mobile apparatuses, such as smartphones and tablet computers, may incorporate digital cameras with such automatic adjustment of image capture parameters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, an apparatus comprises a digital camera unit, at least one processor, and at least one memory storing program instructions that, when executed by the at least one processor, cause the apparatus to: receive a plurality of image frames captured by the digital camera unit, determine a condition being met requiring a switch between image capture states, and in response, one of enable and disable automatic adjustment of at least one image capture parameter without user input.

In another example a method and a computer program product have been discussed along with the features of the apparatus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although some of the present examples may be described and illustrated herein as being implemented in a smartphone or a tablet computer, these are only examples of an apparatus and not a limitation. As those skilled in the art will appreciate, the present examples are suitable for application in a variety of different types of apparatuses incorporating a digital camera module or a digital imaging system, for example, a stand-alone digital camera device, e.g. a compact camera, a SLR (Single-Lens Reflex) camera, or a mirrorless interchangeable-lens camera.

Figure 1:
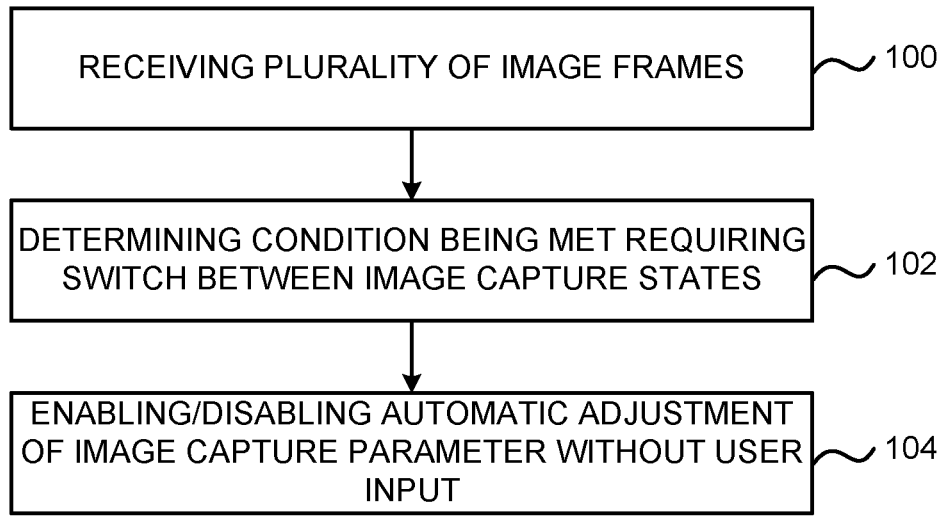
FIG. 1 is a flow diagram of one example of a method.

FIG. 1 shows a method which can be used to enable and disable automatic adjustment of image capture parameter(s). At step 100, a plurality of image frames is received. The image frames have been captured by a digital camera unit. It is determined that a condition is met that requires a switch between image capture states, step 102. The image capture states may comprise e.g. image capture with automatic image capture parameter adjustment and image capture without automatic image capture parameter adjustment. In response, automatic adjustment of at least one image capture parameter is enabled or disabled without user input, step 104. The at least one image capture parameter may comprise e.g. at least one of exposure, focus and white balance.

Figure 2:
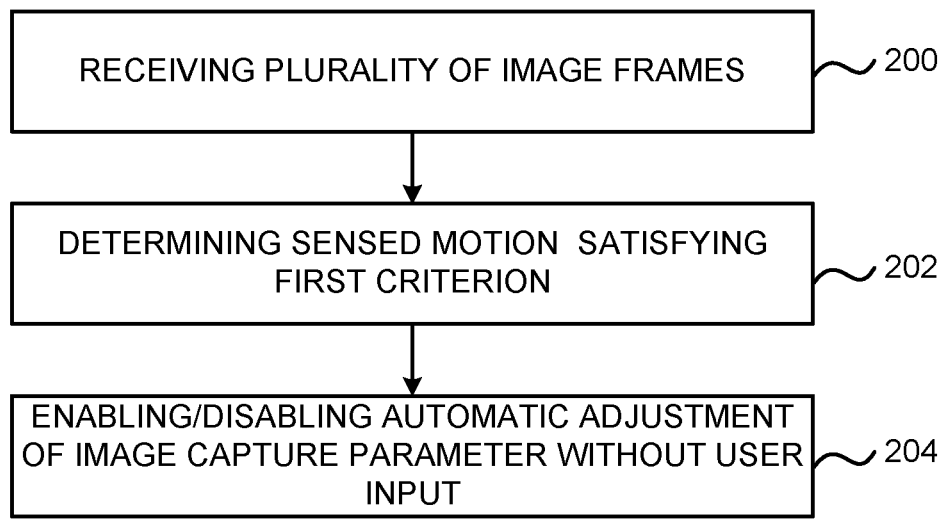
FIG. 2 is a flow diagram of another example of a method.

FIG. 2 shows a method which can be used to enable and disable automatic adjustment of image capture parameter(s). At step 200, a plurality of image frames is received. The image frames have been captured by a digital camera unit. It is determined that a condition is met that requires a switch between image capture states, step 202. More particularly, the condition comprises a motion sensed by a motion sensor satisfying a predetermined first criterion. The motion sensor may comprise e.g. at least one of a gyroscope and an acceleration sensor. The image capture states may comprise e.g. image capture with automatic image capture parameter adjustment and image capture without automatic image capture parameter adjustment. In response, automatic adjustment of at least one image capture parameter is enabled or disabled without user input, step 204. The at least one image capture parameter may comprise e.g. at least one of exposure, focus and white balance.

Figure 3:
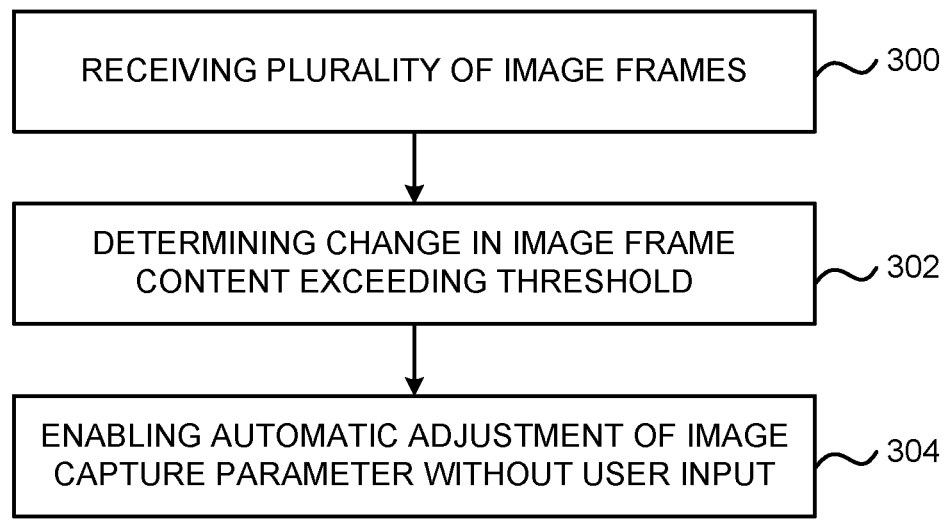
FIG. 3 is a flow diagram of another example of a method.

FIG. 3 shows a method which can be used to enable automatic adjustment of image capture parameter(s). At step 300, a plurality of image frames is received. The image frames have been captured by a digital camera unit. It is determined that a condition is met that requires a switch between image capture states, step 302. More particularly, the condition comprises a change in image frame content between at least two of the received plurality of the image frames exceeding a predetermined threshold. The image capture states may comprise e.g. image capture with automatic image capture parameter adjustment and image capture without automatic image capture parameter adjustment. In response, automatic adjustment of at least one image capture parameter is enabled without user input, step 304. The at least one image capture parameter may comprise e.g. at least one of exposure, focus and white balance. The method of FIG. 3 may be utilized e.g. when there are changes in a scene that are large enough to require the use of the automatic adjustment of the image capture parameter (s).

Figure 4:
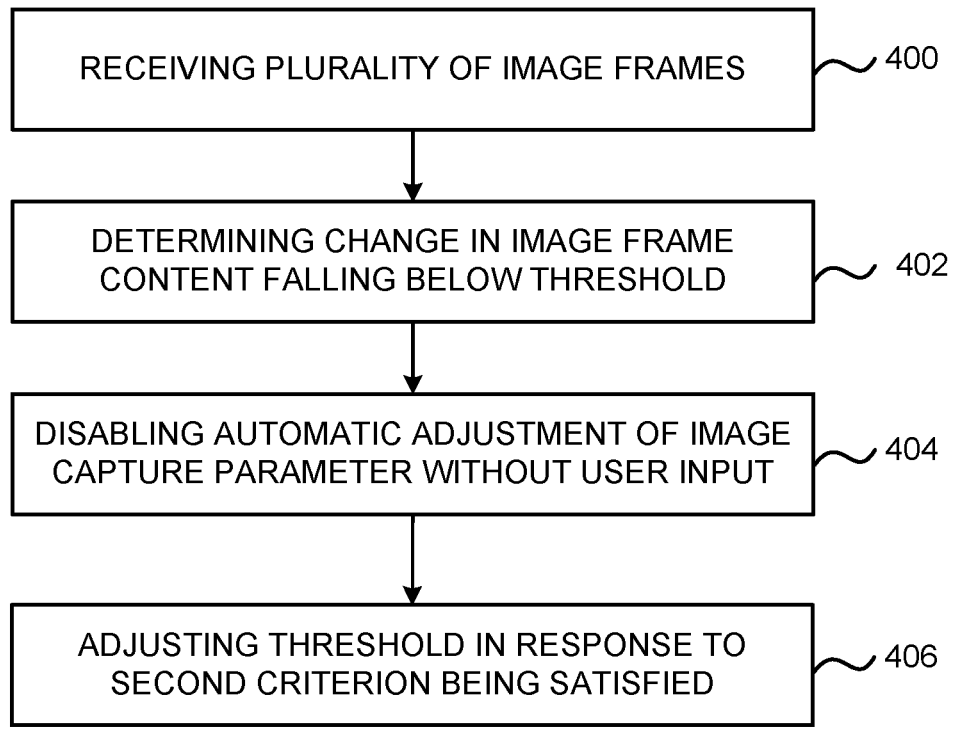
FIG. 4 is a flow diagram of another example of a method.

FIG. 4 shows a method which can be used to disable automatic adjustment of image capture parameter(s). At step 400, a plurality of image frames is received. The image frames have been captured by a digital camera unit. It is determined that a condition is met that requires a switch between image capture states, step 402. More particularly, the condition comprises a change in image frame content between at least two of the received plurality of the image frames falling below a predetermined threshold. The image capture states may comprise e.g. image capture with automatic image capture parameter adjustment and image capture without automatic image capture parameter adjustment. In response, automatic adjustment of at least one image capture parameter is disabled without user input, step 404. The at least one image capture parameter may comprise e.g. at least one of exposure, focus and white balance. At step 406, the threshold may be adjusted in response to a predetermined second criterion being satisfied. The predetermined second criterion may comprise e.g. at least one of the following: amount of motion sensed by a motion sensor, time elapsed since the start of the receipt of the plurality of the image frames, and the image frame content of at least one of the received plurality of the image frames comprising a predetermined region of interest (e.g. a face area). The motion sensor may comprise e.g. at least one of a gyroscope and an acceleration sensor. The adjusted threshold may be utilized in analyzing/determining changes in further image frames.

Figure 5:
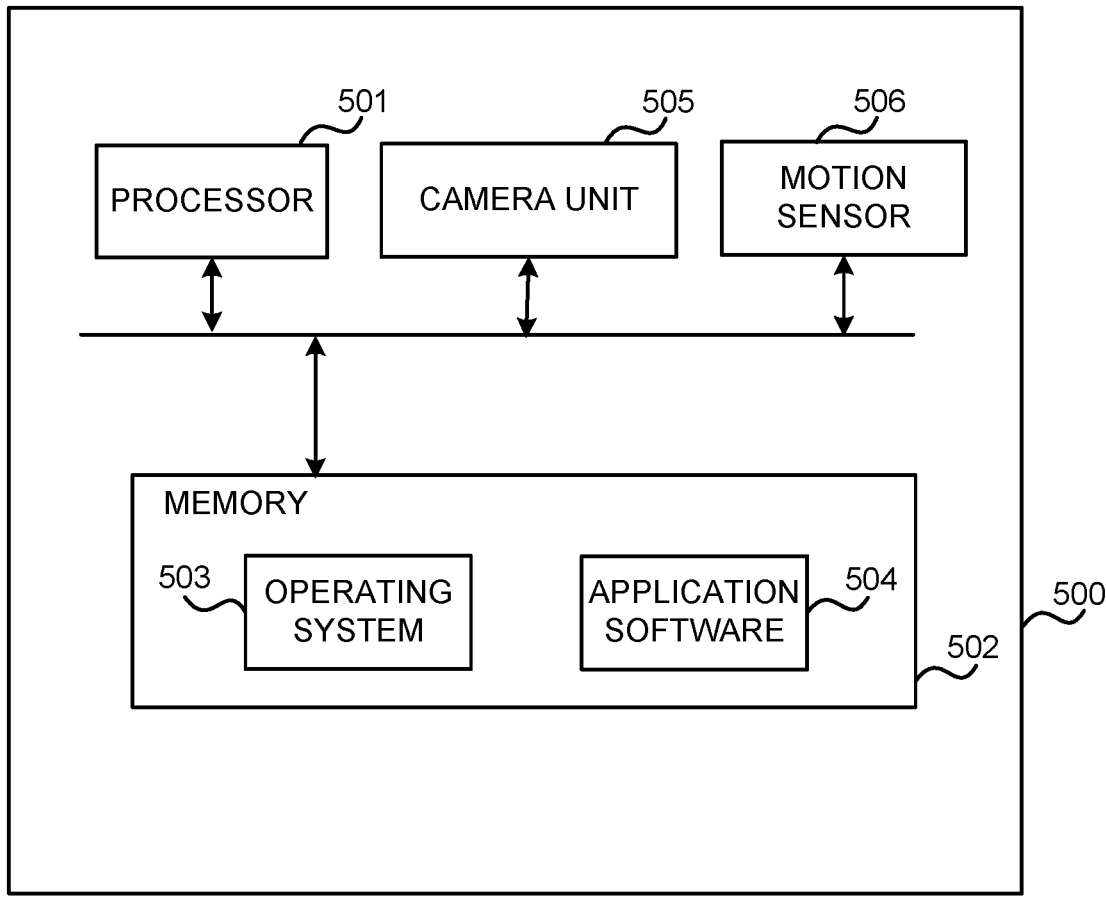
FIG. 5 is a block diagram of one example of an apparatus.

FIG. 5 shows a block diagram of one example of an apparatus 500 which may be implemented as any form of a computing device and/or electronic device that incorporates a digital camera module or a digital imaging system. For example, the apparatus 500 may be implemented as a stand-alone digital camera device, e.g. a compact camera, a SLR camera, or a mirrorless interchangeable-lens camera, or the apparatus 500 may be implemented e.g. as a smartphone, a tablet computer, a wearable camera or a web camera.

The apparatus 500 comprises a digital camera unit 505. The apparatus 500 further comprises at least one processor 501, and at least one memory 502. Stored in the at least one memory 502 are program instructions 503, 504 that, when executed by the at least one processor 501, cause the apparatus 500 to: receive a plurality of image frames captured by the digital camera unit 505, determine a condition being met requiring a switch between image capture states, and in response, one of enable and disable automatic adjustment of at least one image capture parameter without user input. The image capture states may comprise e.g. image capture with automatic image capture parameter adjustment and image capture without automatic image capture parameter adjustment. The at least one image capture parameter may comprise e.g. at least one of exposure, focus and white balance. The apparatus 500 may further comprise a motion sensor 506. The motion sensor 506 may comprise e.g. at least one of a gyroscope and an acceleration sensor.

The digital camera unit 505 comprises at least an optical system including a lens arrangement and an image sensor, such as a charge-coupled device (CCD) sensor or a complementary metal-oxide-semiconductor (CMOS) sensor.

The condition may comprise a motion sensed by the motion sensor 506 that satisfies a predetermined first criterion. Alternatively or in addition, the condition may comprise a change in image frame content between at least two of the received plurality of the image frames one of exceeding and falling below a predetermined threshold.

The at least one memory 502 may further store program instructions that, when executed by the at least one processor 501, cause the apparatus 500 to enable the automatic adjustment of the at least one image capture parameter without user input in response to the condition comprising the change in the image frame content exceeding the predetermined threshold. Alternatively or in addition, the at least one memory 502 may further store program instructions that, when executed by the at least one processor 501, cause the apparatus 500 to disable the automatic adjustment of the at least one image capture parameter without user input in response to the condition comprising the change in the image frame content falling below the predetermined threshold.

The at least one memory 502 may further store program instructions that, when executed by the at least one processor 501, cause the apparatus 500 to adjust the threshold in response to a predetermined second criterion being satisfied. The predetermined second criterion may comprise at least one of the following: the amount of motion sensed by the motion sensor 506, time elapsed since the start of the receipt of the plurality of the image frames, and the image frame content of at least one of the received plurality of the image frames comprising a predetermined region of interest.

In regards to using elapsed time as the second criterion, as an example, the threshold could be high in the very beginning of the capture, but then start to decrease as a function of time. In an embodiment this could be implemented with additional discrete steps, e.g. enabling the automatic adjustment of at least one image capture parameter without user input after a given amount of seconds. In regards to using region of interest information as the second criterion, as an example, if there is face or some other predetermined region of interest in an image frame, the threshold may be adjusted to be lower.

As discussed above, the apparatus 500 comprises one or more processors 501 which may be microprocessors, controllers or any other suitable type of processors for processing computer executable instructions to control the operation of the apparatus 500. Platform software comprising an operating system 503 or any other suitable platform software may be provided at the apparatus 500 to enable application software 504 to be executed on the device. The application software 504 may include e.g. software used in operating the camera unit 505.

Computer executable instructions may be provided using any computer-readable media that is accessible by the apparatus 500. Computer-readable media may include, for example, computer storage media such as memory 502 and communications media. Computer storage media, such as memory 502, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 502) is shown within the apparatus 500 it will be appreciated that the storage may be distributed or located remotely and accessed via a network or other communication link.

At least some of the examples disclosed in FIGS. 1-5 are able to provide automatic processing (i.e. automatic enabling and disabling) of automatic adjustment of image capture parameters. Digital camera modes may include at least a video capture mode, a still image capture mode, and a combined video and still image capture mode. These camera modes may have different requirements regarding automatic adjustment of image capture parameters. Also, a given camera mode may have different requirements regarding automatic adjustment of image capture parameters depending on its purpose of use.

For example, the video capture mode and/or the still image capture mode may utilize automatic adjustment of image capture parameters when they are intended for use by amateurs/consumers to allow adapting easily to changes in a scene for optimal quality. On the other hand, the video capture mode and/or the still image capture mode may not utilize automatic adjustment of image capture parameters when they are intended for use by professional users to allow more precise control. Alternatively, the video capture mode and/or the still image capture mode when for use by professionals may utilize automatic adjustment of image capture parameters only in response to large changes in the scene, e.g. a large illuminant change. At least some of the examples disclosed in FIGS. 1-5 are able to provide automatic (i.e. without user input) enabling and disabling of the automatic adjustment of the image capture parameters between and within the video capture mode and the still image capture mode.

Furthermore, herein the combined video and still image capture mode refers to a video capture mode that is optimized for occasional still image generation from video frames between/before/after shooting traditional video. That is, video frames may be used as input for further processing to produce still images from them. To allow such a processing, it is usually important that the image capture parameters (e.g. focusing, exposure and white balance) do not change. But on the other hand, if the user wants to capture traditional video instead of improved still image, the image capture parameters should usually adapt to changes in the scene for optimal quality. Again, at least some of the examples disclosed in FIGS. 1-5 are able to provide automatic (i.e. without user input) enabling and disabling of the automatic adjustment of the image capture parameters within the combined video and still image capture mode as needed, as well as between the combined video and still image capture mode and the video capture mode and/or the still image capture mode.

An embodiment of an apparatus comprises a digital camera unit, at least one processor, and at least one memory storing program instructions that, when executed by the at least one processor, cause the apparatus to: receive a plurality of image frames captured by the digital camera unit, determine a condition being met requiring a switch between image capture states, and in response, one of enable and disable automatic adjustment of at least one image capture parameter without user input.

In an embodiment, alternatively or in addition, the apparatus further comprises a motion sensor and the condition comprises a motion sensed by the motion sensor satisfying a predetermined first criterion.

In an embodiment, alternatively or in addition, the condition comprises a change in image frame content between at least two of the received plurality of the image frames one of exceeding and falling below a predetermined threshold.

In an embodiment, alternatively or in addition, the at least one memory further stores program instructions that, when executed by the at least one processor, cause the apparatus to enable the automatic adjustment of the at least one image capture parameter without user input in response to the condition comprising the change in the image frame content exceeding the predetermined threshold.

In an embodiment, alternatively or in addition, the at least one memory further stores program instructions that, when executed by the at least one processor, cause the apparatus to disable the automatic adjustment of the at least one image capture parameter without user input in response to the condition comprising the change in the image frame content falling below the predetermined threshold.

In an embodiment, alternatively or in addition, the at least one memory further stores program instructions that, when executed by the at least one processor, cause the apparatus to adjust the threshold in response to a predetermined second criterion being satisfied.

In an embodiment, alternatively or in addition, the predetermined second criterion comprises at least one of amount of motion sensed by a motion sensor comprised in the apparatus, time elapsed since the start of the receipt of the plurality of the image frames, and the image frame content of at least one of the received plurality of the image frames comprising a predetermined region of interest.

In an embodiment, alternatively or in addition, the at least one image capture parameter comprises at least one of automatic exposure, automatic focus and automatic white balance.

In an embodiment, alternatively or in addition, the image capture states comprise image capture with automatic image capture parameter adjustment and image capture without automatic image capture parameter adjustment.

In an embodiment, alternatively or in addition, the motion sensor comprises at least one of a gyroscope and an acceleration sensor.

In an embodiment, alternatively or in addition, the apparatus comprises a mobile communication device.

An embodiment of a method comprises receiving a plurality of image frames captured by a digital camera unit; determining a condition being met requiring a switch between image capture states; and in response, one of enabling and disabling automatic adjustment of at least one image capture parameter without user input.

In an embodiment, alternatively or in addition, the condition comprises a motion sensed by a motion sensor satisfying a predetermined first criterion.

In an embodiment, alternatively or in addition, the condition comprises a change in image frame content between at least two of the received plurality of the image frames one of exceeding and falling below a predetermined threshold.

In an embodiment, alternatively or in addition, the enabling the automatic adjustment of the at least one image capture parameter without user input is performed in response to the condition comprising the change in the image frame content exceeding the predetermined threshold.

In an embodiment, alternatively or in addition, the disabling the automatic adjustment of the at least one image capture parameter without user input is performed in response to the condition comprising the change in the image frame content falling below the predetermined threshold.

In an embodiment, alternatively or in addition, the method further comprises adjusting the threshold in response to a predetermined second criterion being satisfied.

In an embodiment, alternatively or in addition, the predetermined second criterion comprises at least one of amount of motion sensed by a motion sensor comprised in the apparatus, time elapsed since the start of the receipt of the plurality of the image frames, and the image frame content of at least one of the received plurality of the image frames comprising a predetermined region of interest.

In an embodiment, alternatively or in addition, the at least one image capture parameter comprises at least one of exposure, focus and white balance.

An embodiment of a computer-readable storage medium comprises executable instructions for causing at least one processor of an apparatus to perform operations comprising: receiving a plurality of image frames captured by a digital camera unit; determining a condition being met requiring a switch between image capture states; and in response, one of enabling and disabling automatic adjustment of at least one image capture parameter without user input.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus configured to automatically switch between capturing images with automatic image capture parameter adjustment and capturing images without automatic image capture parameter adjustment based on one or more conditions, the apparatus comprising:
   a digital camera unit;
   at least one processor; and
   at least one memory storing program instructions that, when executed by the at least one processor, cause the apparatus to:
   receive a request to capture images in a combined video and still image capture mode:
      based on the received request, disable automatic adjustment of at least one image capture parameter;
      receive a plurality of image frames captured by the digital camera unit while automatic adjustment of at least one image capture parameter is disabled;
      identify a condition comprising a change in image frame content between two successive frames of the plurality of image frames;
      based on the identified condition, determine whether the change in the image frame content between the two successive frames of the plurality of image frames falls below a threshold;

upon determining that the change in the image frame content between the two successive frames of the plurality of image frames falls below the threshold, maintain the automatic adjustment of the at least one image capture parameter being disabled for subsequent image frame capture by the digital camera unit; and upon determining that the change in the image frame content between the two successive frames of the plurality of image frames does not fall below the threshold, enable the automatic adjustment of the at least one image capture parameter for subsequent image frame capture by the digital camera unit.

2. The apparatus as claimed in claim 1, wherein the image capture parameter is focus, exposure, and white balance.

3. The apparatus as claimed in claim 2, wherein the plurality of image frames are captured during a video capture mode.

4. The apparatus as claimed in claim 2, wherein the plurality of image frames are captured during a still image capture mode.

5. The apparatus as claimed in claim 1, wherein the image capture parameter is two or more of the following: focus, exposure, and white balance.

6. The apparatus as claimed in claim 5, wherein the apparatus further comprises a motion sensor configured to sense the motion.

7. The apparatus as claimed in claim 5, wherein the at least one memory further stores program instructions that, when executed by the at least one processor, cause the apparatus to adjust the threshold based on an experience level of a user.

8. The apparatus as claimed in claim 1, wherein the threshold identifies an amount of motion.

9. A method for automatically switching between capturing images with automatic image capture parameter adjustment and capturing images without automatic image capture parameter adjustment based on one or more conditions, the method comprising:

receiving a request to capture images in a combined video and still image capture mode;

based on the received request, disabling automatic adjustment of at least one image capture parameter;

receiving a plurality of image frames captured by a digital camera unit while automatic adjustment of at least one image capture parameter is disabled;

identifying a condition comprising a change in image frame content between two successive frames of the plurality of image frames;

based on the identified condition, determining whether the change in the image frame content between the two successive frames of the plurality of image frames falls below a threshold;

upon determining that the change in the image frame content between the two successive frames of the plurality of image frames falls below the threshold, maintaining the automatic adjustment of the at least one image capture parameter being disabled for subsequent image frame capture by the digital camera unit; and upon determining that the change in the image frame content between the two successive frames of the plurality of image frames does not fall below the threshold, enabling the automatic adjustment of the at least one image capture parameter for subsequent image frame capture by the digital camera unit.

10. A method as claimed in claim 9, wherein the image capture parameter is one or more of the following: focus, exposure, and white balance.

11. A method as claimed in claim 10, wherein the plurality of image frames are captured during a video capture mode.

12. A method as claimed in claim 11, wherein the plurality of image frames are captured during a still image capture mode.

13. A method as claimed in claim 9, wherein the identified condition is motion.

14. A method as claimed in claim 9, further comprising adjusting the threshold based on an experience level of a user.

15. A computer-readable storage medium comprising executable instructions for causing at least one processor of an apparatus to perform operations comprising:

receiving a request to capture images in a combined video and still image capture mode;

based on the received request, disabling automatic adjustment of at least one image capture parameter;

receiving a plurality of image frames captured by a digital camera unit while automatic adjustment of at least one image capture parameter is disabled;

identifying a condition comprising a change in image frame content between two successive frames of the plurality of image frames;

based on the identified condition, determining whether the change in the image frame content between the two successive frames of the plurality of image frames falls below a threshold;

upon determining that the change in the image frame content between the two successive frames of the plurality of image frames falls below the threshold, maintaining the automatic adjustment of the at least one image capture parameter being disabled for subsequent image frame capture by the digital camera unit; and upon determining that the change in the image frame content between the two successive frames of the plurality of image frames does not fall below the threshold, enabling the automatic adjustment of the at least one image capture parameter for subsequent image frame capture by the digital camera unit.

16. The computer-readable storage medium of claim 15, wherein the image capture parameter is one or more of the following: focus, exposure, and white balance.

17. The computer-readable storage medium of claim 16, wherein the plurality of image frames are captured during a video capture mode.

18. The computer-readable storage medium of claim 16, wherein the plurality of image frames are captured during a still image capture mode.

19. The computer-readable storage medium of claim 15, wherein the identified condition is motion.

20. The computer-readable storage medium of claim 15, wherein the computer executable instructions further cause the processor to adjust the threshold based on an experience level of a user.

* * * * *